United States Patent [19]

Blinchikoff et al.

[11] Patent Number: 5,182,563
[45] Date of Patent: Jan. 26, 1993

[54] ENHANCED PERFORMANCE MODE S INTERROGATOR

[75] Inventors: Herman J. Blinchikoff, Pikesville; Ann C. Schofield, Columbia, both of Md.

[73] Assignee: Westinghouse Electric Corp., Pittsburgh, Pa.

[21] Appl. No.: 786,835

[22] Filed: Nov. 1, 1991

[51] Int. Cl.⁵ .................................. G01S 13/91
[52] U.S. Cl. ............................. 342/32; 342/149
[58] Field of Search ..................... 342/32, 149, 151

[56] References Cited
PUBLICATIONS

Feistel et al., "Tiefpasse mit Tsechebyscheff-Charakter der Betriebdamphung in Sperribereich und maximal geebneter Laufzet" Frequenz Bd 19 pp. 265-282 (1965).
Baker, Orlando, Link & Collins, "Mode S System Design and Architecture", Proc, vol. 77, No. 11 (1989) pp. 1684-1694.

Primary Examiner—T. H. Tubbesing
Attorney, Agent, or Firm—W. G. Sutcliff

[57] ABSTRACT

An enhanced performance Mode S interrogator that includes a matched channel receiver. The receiver includes equiripple-phase response filters with finite peaks of attenuation. This new class of filters provides a faster rise of attenuation than all-pole filter while extending the equiripple delay further into the stopband.

1 Claim, 3 Drawing Sheets

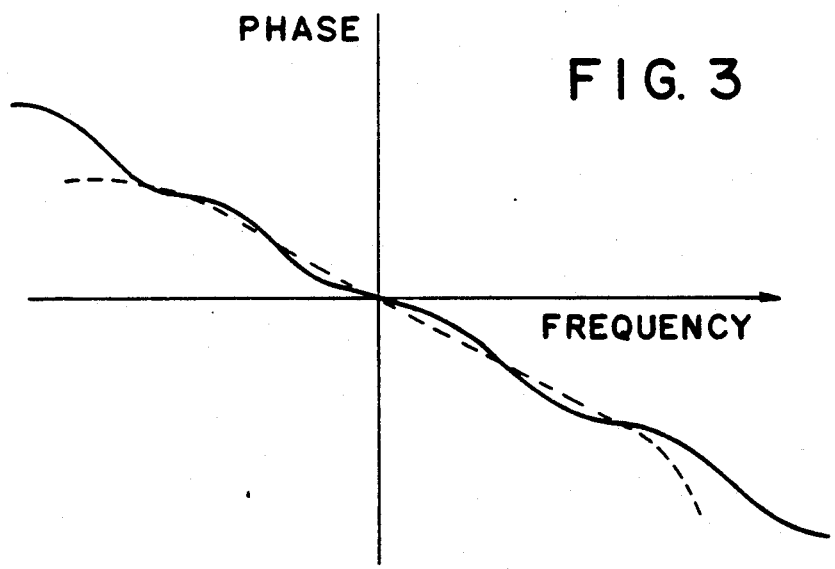
FIG. 3
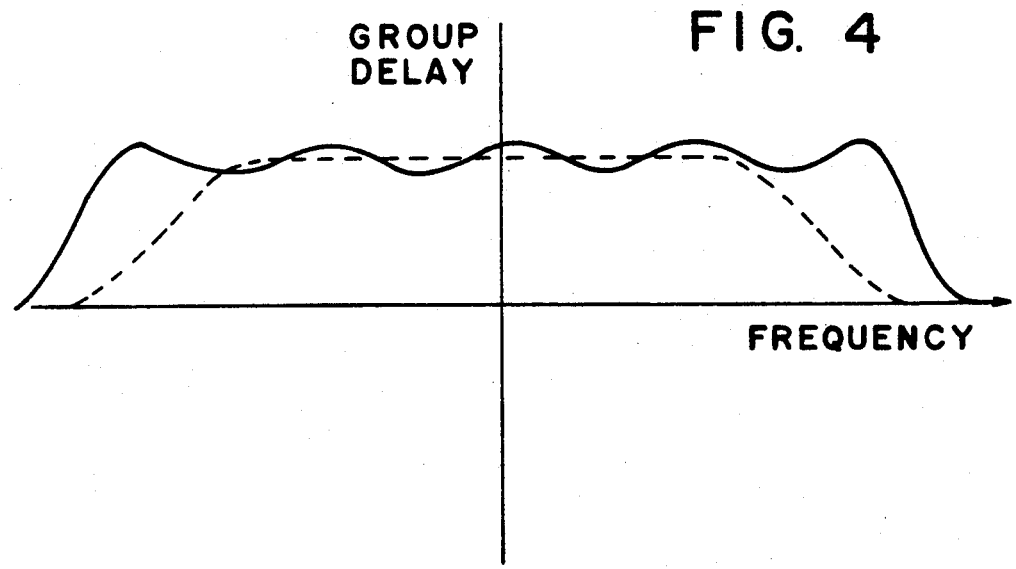
FIG. 4
FIG. 5
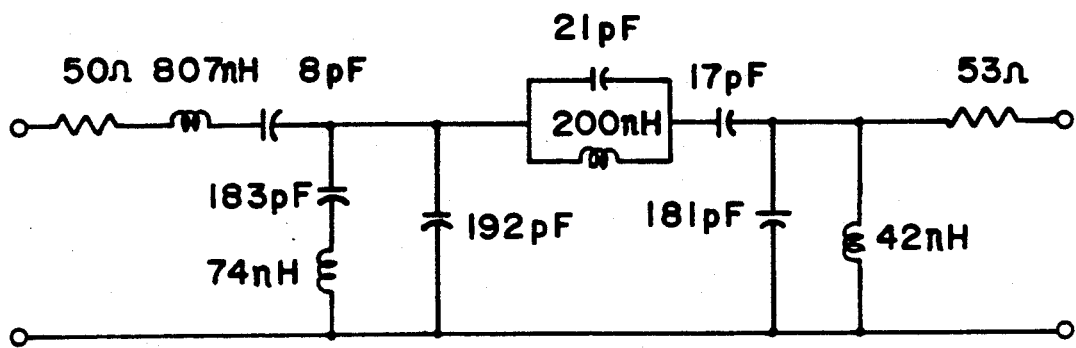

ENHANCED PERFORMANCE MODE S INTERROGATOR

BACKGROUND OF THE INVENTION

The present invention relates to a Mode select (Mode-S) air traffic control radar beacon system (ATCRBS); and more particularly to an enhanced performance Mode S interrogator subsystem. For efficient management of high traffic environments it is essential that an ATCRBS accurately identify and locate potentially closely spaced aircraft. In general Mode S ATCRBS selectively identifies and interrogates individual aircraft using known half angle phase-comparison monopulse azimuth determination and a multi-pattern antenna 10 such as shown in FIG. 1. The pattern includes three patterns, a sum pattern 15, difference patterns 20, and an omnipattern 25. As is evident from FIG. 1, the sum pattern 15 is equivalent to a single main beam of a non-monopulse system. When a target is located at an angle $\theta$ off-bore site, the sum and difference patterns detect returns with differing amplitudes and phases. By applying known coherent phase comparison techniques, the angle $\theta$ can be accurately determined using a ratio of the sum and difference signals. However, to accurately determine the angle $\theta$, sum and difference channels in a receiver must be carefully matched in terms of, for example, phase response, group delay and frequency response. This places strict requirements on these channels, and in particular, filters used within the interrogator receiver.

SUMMARY OF THE INVENTION

It is an object with the present invention to provide an interrogator capable of reliably determining the position of an aircraft.

It is another object of the present invention to provide an interrogator with a matched channel receiver.

It is a further object of the present invention to provide an interrogator with a low cost matched channel receiver.

It is still another object of the present invention to provide an interrogator with a receiver using an equiripple-phase response filter with finite peaks of attenuation.

It is still a further object of the present invention to provide an interrogator with a receiver using minimum order equiripple-phase response filters with finite peaks of attenuation.

To achieve the above and other objects, the present invention provides an enhanced performance Mode S interrogator for interrogating an aircraft and processing a reply, the interrogator comprising a multi-pattern antenna; a multichannel monopulse transmitter, operatively coupled to the multi-pattern antenna for transmitting interrogation information; a monopulse receiver, operatively coupled to the multi-patterned antenna for detecting pulses representing the reply, the receiver including an equiripple-phase response filter with finite peaks of attenuation that satisfies the following transfer functions for low pass prototypes $n$ odd $$H(s) = \frac{(s^2 + \omega_1^2)(s^2 + \omega_2^2) \ldots (s^2 + \omega_{\frac{n-1}{2}})}{(s^n + a_{n-1}s^{n-1} + \ldots + a_0)}$$

-continued $n$ even $$H(s) = \frac{(s^2 + \omega_1^2)(s^2 + \omega_2^2) \ldots (s^2 + \omega_{\frac{n-2}{2}})}{(s^n + a_{n-1}s^{n-1} + \ldots + a_0)}$$

BRIEF DESCRIPTION OF THE DRAWINGS

FIG. 3 is a graph illustrating the phase response of a filter in accordance with the present invention and the phase response of a maximally-flat delay filter with attenuation peaks;

FIG. 4 is a graph illustrating a group delay of a filter in accordance with the present invention and a group delay of a maximally-flat delay filter with attenuation peaks; and FIG. 5 is one realization of the bandpass filter with the above transfer function poles and zeros.

DESCRIPTION OF THE PREFERRED EMBODIMENTS

Figure 1:
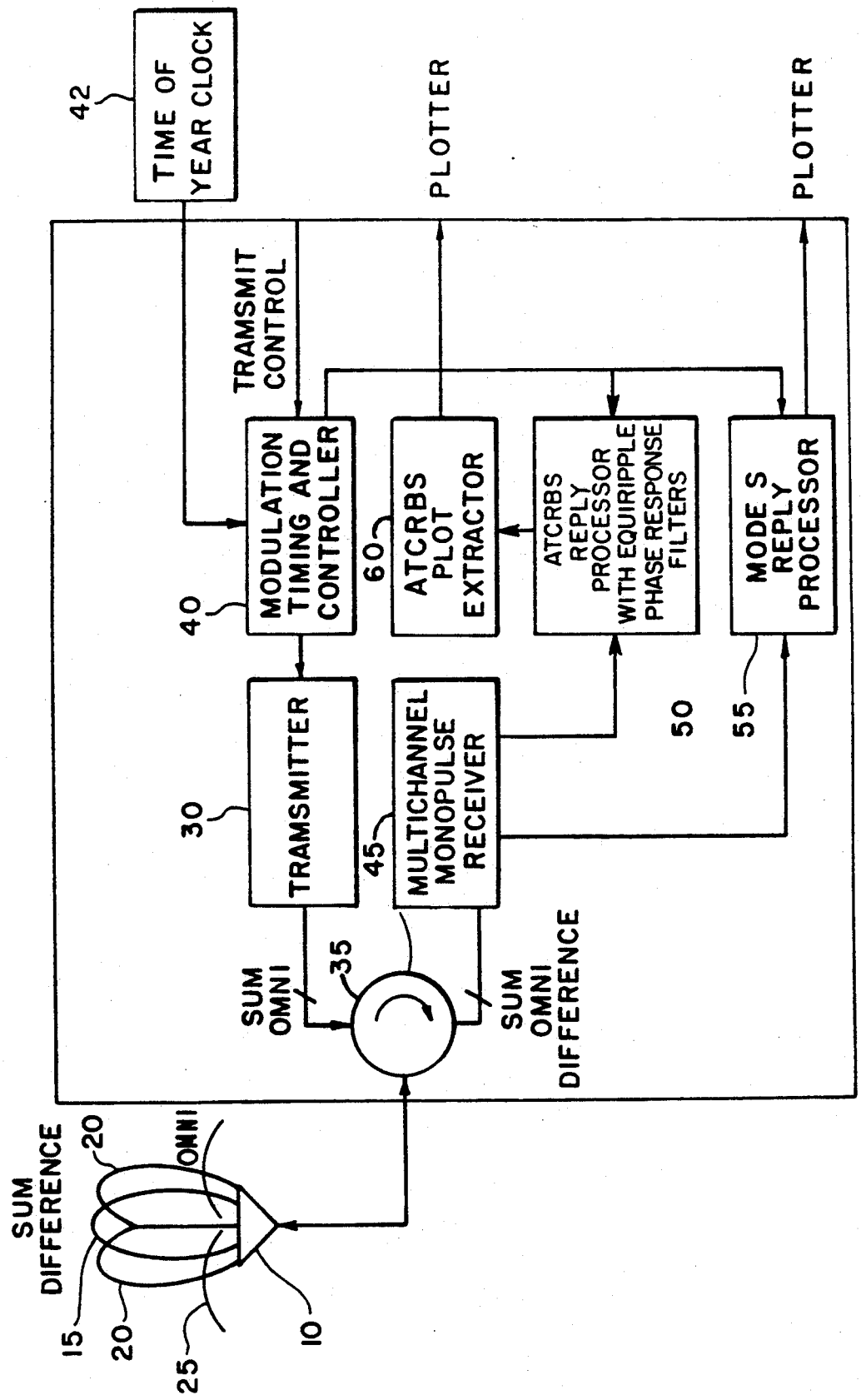
FIG. 1 is a block diagram of an interrogator embodying the present invention.

FIG. 1 is a block diagram of an interrogator embodying the present invention. The basic structure and operation of a Mode S interrogator such as shown in FIG. 1 is described in the Department of Transportation, Federal Aviation Administration Specification, Mode Select Beacon System Sensor, FAA-E-2716 (1984), which is hereby incorporated herein by reference. This FAA specification describes the function and operation of the individual blocks shown in FIG. 1 as summarized in the following.

A monopulse transmitter 30 transmits interrogation information via the multi-pattern antenna 10 and a diplexer 35. In general, the transmitter 30 transmits the interrogation information pulses at a frequency 1030 MHz. Transmit control signals are provided to the interrogator from an external data processing system and represent interrogation information. These signals provide the modulation and timing controller 40 with the Mode of interrogation (e.g., Mode 3/A, Mode C, Mode S), the power level, the pulse repetition rate, and method of sidelobe suppression. The modulation and timing controller 40 decodes these signals, applies the appropriate timing (time is received from a TIME OF YEAR CLOCK 42), and generates the necessary modulation pulses to the transmitter 30.

In FIG. 1, reference numeral 45 identifies a multichannel, half angle, phase-monopulse receiver. The receiver 45 detects pulses representing a reply from an aircraft; and in particular, the receiver 45 receives returns detected by the sum pattern 15 and omnipattern 25 and returns detected by the difference pattern 20. To accurately determine the location of an aircraft that is positioned at an angle $\theta$ with respect to the bore site of the multi-pattern antenna 10, the receiver 45 must have carefully matched channels. To achieve this, the receiver 45 includes equiripple-phase response filters with finite peaks of attenuation. These filters are described in more detail below. The receiver 45 generates a stream of digitized pulses that are applied to an ATCRBS reply processor 50 and a Mode S reply processor 55. The ATCRBS reply processor 50 decodes the pulse stream provided by the receiver 45 in order to identify the azimuth of each of the aircraft interrogated. An ATCRBS plot extractor 60 tracks the replies from an aircraft and performs a reply-to-reply correlation to generate a plot of the location of each of the aircraft interrogated. The Mode S reply processor 55 decodes the pulse stream provided by the receiver 45 and performs monopulse averaging and error correction of the individual replies received from each aircraft equipped with Mode S reply hardware. The replies are processed to generate a Mode S plot that indicates the location of each of the aircraft equipped with Mode S hardware.

Figure 2:
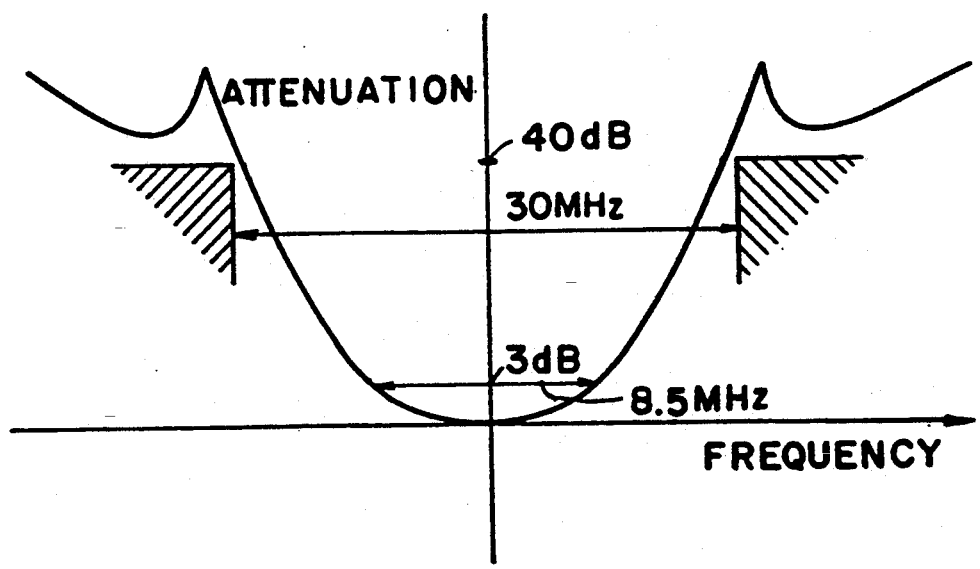
FIG. 2 is a graph illustrating the phase response of a filter in accordance with the present invention.

A critical feature of the interrogator in accordance with the present invention is the equiripple-phase response filters with finite peaks of attenuation that are included in the receiver 45. These filters provide the bandwidth and linear phase response necessary to accurately determine the angle $\theta$ of an aircraft with respect to the bore site of the multi-pattern antenna 10. In order to ensure matching between channels in the receiver 45, it is desirable to minimize the order of the filters. This minimizes the number of parts in each of the required filters, reduces the cost, size and manufacturing difficulties of the filter. FIGS. 2-4 respectively illustrate the attenuation response, phase response and group delay of a filter in accordance with the present invention. In a preferred embodiment of the present invention, the center frequency of the filter is 60 MHz. As shown in FIG. 2, the filter has a 3 dB bandwidth of 8.5 MHz; and a 40 dB bandwidth of 28 MHz. The requirement is 30 MHz maximum. In a preferred embodiment of the present invention, the required channel matching noted above, requires that the phase linearity between channels must be linear to at least $\pm 10$ degrees in the range of 53 MHz to 67 MHz. Thus, the needed phase linearity extends over a bandwidth approximately 65% wider than the 3dB bandwidth. The phase response between channels must be matched to within 6 degrees over the 53 MHz to 67 MHz range.

To determine the bandpass response, a typical approach is to select a suitable all-pole low pass response and then apply the known narrow band, low pass to bandpass frequency transformation. In attempting to meet the requirements of the filters for the interrogator of the present invention, the inventors examined catalogs of all-pole low pass filters to determine the minimum order filter that satisfied the desired 40 dB response requirement. Such a catalog is exemplified by the *Handbook of Filter Syntheses* by Anatol Zverey that is published by John Wiley (1967). This examination indicated that a fifth order, half-degree equiripple-phase filter was needed to satisfy the 40 dB stopband attenuation requirement. Other filter families such as Gaussian filter families required at least a tenth order filter to satisfy the requirement. However, in order to limit manufacturing costs and make filter tuning easier in production, as well as to facilitate matching between filters, it is advantageous to use the lowest order filter possible.

As is known in the art, one can select a low pass prototype filter, and apply the narrow band, low pass to bandpass frequency transformation using the following $$S_i = (\Delta f) S_i \pm j\omega_o \quad (1)$$

, where $\Delta f$ is the desired 3 dB bandwidth, $S_i$ is the normalized low pass pole or zero and $\omega_o$ is the center frequency. In selecting a suitable low pass prototype, the inventors investigated a low pass filter with finite transfer function zeros that has a maximally flat group delay. Such a filter is discussed in Feistel et. al., "Tiefpasse mit Tsechebyscheff-Charakter der Betriebdamphung im Sperribereich und maximal geebneter Laufzeit," FREQUENZ Bd 19 pp. 265-282 (1965).

This filter, however failed to satisfy the minimum stopband requirement of 40 dB, because the attenuation between attenuation peaks was less than 40 dB for a filter order equal to the order of the proposed filter.

In FIGS. 3 and 4, the broken lines respectively represent the phase response and group delay of the above-described maximally flat group delay filter. Referring to FIG. 3, it is seen that the linearity is superior to that of the filter of the present invention over a narrow range. However, as discussed above, this filter does not meet the stopband attenuation requirements. Thus, by giving up some phase linearity, as shown by the solid line in FIG. 3 and by giving up some group delay linearity as shown in the solid line in FIG. 4, increased bandwidth with relatively constant delay can be obtained with only minimal effects on the phase linearity and group delay while achieving the required stopband attenuation.

To achieve the desired characteristics, the inventors developed a new filter classified as an equiripple-phase response with peaks of attenuation rather than monotonic attenuation. As seen in FIG. 2, the attenuation peaks of the transformed bandpass stopband attenuation minima are greater than 40 dB. Because of the increased attenuation provided by the filter in accordance with the present invention, only a fourth order low pass prototype filter was needed to achieve the desired characteristics. The equiripple-phase response filter with finite peaks of attenuation in accordance with the present inventions satisfies the following transfer functions for the low pass prototype.

$n$ odd $$H(s) = \frac{(s^2 + \omega_1^2)(s^2 + \omega_2^2)\ldots(s^2 + \omega_{\frac{n-1}{2}})}{(s^n + a_{n-1}s^{n-1} + \ldots + a_0)} \quad (2)$$

$n$ even $$H(s) = \frac{(s^2 + \omega_1^2)(s^2 + \omega_2^2)\ldots(s^2 + \omega_{\frac{n-2}{2}})}{(s^n + a_{n-1}s^{n-1} + \ldots + a_0)} \quad (3)$$

These low pass filter responses are then transformed using equation (1) to realize a band pass response that is approximately symmetrical about the desired center frequency. To improve the stopband attenuation, two zeros are placed on the $j\omega$ axis. The zeros on the $j\omega$ axis do not change the group delay. Instead, the zeros change the magnitude of the response; that is, the frequency response. For the characteristics of an embodiment of the present invention, unity radian 3 dB cutoff frequency poles and zeros of the low pass filter are:

$P_{1,2} = -0.82936509 \pm j0.57158364$ $P_{3,4} = -0.67227122 \pm j1.6685274$ $z_{1,2} = \pm j3.8604306$

After transforming the transfer functions of equations 2 and 3 using equation 1, and adjusting the finite zeros to yield a 3 db bandwidth of 0.85 MHz, and with two zeros added at $\omega = 0$ for improved attenuation symmetry, the bandpass transfer functions poles and zeros are:

$P_{1,2} = -2.2146982 \times 10^7 \pm j3.8911283 \times 10^8$ $P_{3,4} = -2.2146982 \times 10^7 \pm j3.5858623 \times 10^8$ $P_{5,6} = -1.7952020 \times 10^7 \pm j4.1840512 \times 10^8$ $P_{7,8} = -1.7952020 \times 10^7 \pm j3.2929395 \times 10^8$ $z_{1,2} = \pm j4.8321216 \times 10^8$ $z_{3,4} = \pm j2.7090889 \times 10^8$ $z_4 = 0$ $z_5 = 0$ FIG. 5 is one realization of the bandpass filter with the above transfer function poles and zeros. As those skilled in the art will recognize, there are various commercially available programs to both simulate and generate networks given the poles and zeros of a transfer function. The realization shown in FIG. 5 was developed using the commercially available program FILSYN.

The present invention provides an interrogator that incorporates filters with an equiripple-phase response and attenuation peaks that retain the same equiripple group delay characteristics as known all-pole low pass filters. The filter of the present invention, however, provides a faster rise of stopband attenuation than the all-pole filter, and more stopband attenuation than the maximally-flat delay filter with attenuation peaks.

While the above describes the present invention with respect to a preferred embodiment, this embodiment merely illustrates the present invention and is not intended to limit the scope of the present invention. Instead, the scope of the present invention is defined by the following claims.

We claim:

1. An enhanced performance Mode S interrogator for interrogating an aircraft and processing a reply, said interrogator comprising:
   a multi-pattern antenna;
   a multichannel monopulse transmitter, operatively coupled to said multi-pattern antenna for transmitting interrogation information;
   a monopulse receiver, operatively coupled to said multipatterned antenna for detecting pulses representing the reply, said receiver including an equiripple-phase response filter with finite peaks of attenuation that satisfies the following low pass prototype transfer functions $n$ odd
$$H(s) = \frac{(s^2 + \omega_1^2)(s^2 + \omega_2^2) \ldots (s^2 + \omega_{\frac{n-1}{2}})}{(s^n + a_{n-1}s^{n-1} + \ldots + a_0)}$$

$n$ even
$$H(s) = \frac{(s^2 + \omega_1^2)(s^2 + \omega_2^2) \ldots (s^2 + \omega_{\frac{n-2}{2}})}{(s^n + a_{n-1}s^{n-1} + \ldots + a_0)}$$

reply processing means for determining the location of and identification of the aircraft based on the detected pulses.

* * * * *